(12) United States Patent
Narayanan V.

(10) Patent No.: US 8,267,227 B2
(45) Date of Patent: Sep. 18, 2012

(54) LEVER ASSEMBLY FEATURING BLIND CABLE ASSEMBLY

(75) Inventor: Lakshmi Narayanan V., Farmington, MI (US)

(73) Assignee: Akebono Brake Corporation, Farmington Hills, MI (US)

( * ) Notice: Subject to any disclaimer, the term of this patent is extended or adjusted under 35 U.S.C. 154(b) by 1092 days.

(21) Appl. No.: 12/177,254

(22) Filed: Jul. 22, 2008

(65) Prior Publication Data

US 2010/0018813 A1  Jan. 28, 2010

(51) Int. Cl.
*F16D 65/14* (2006.01)

(52) U.S. Cl. .................................... 188/2 D; 188/106 A

(58) Field of Classification Search ................ 188/2 D, 188/325, 106 F, 106 A, 106 P, 79.55, 79.57; 74/502.6

See application file for complete search history.

(56) References Cited

U.S. PATENT DOCUMENTS

| | | |
|---|---|---|
| 1,913,156 A | 6/1933 | Frehse |
| 1,981,957 A | 11/1934 | Kohr |
| 2,118,188 A | 5/1938 | Gallup |
| 3,074,675 A | 1/1963 | Brown |
| 3,351,159 A | 11/1967 | Burnett |
| 3,651,896 A | 3/1972 | Fannin |
| 4,061,210 A | 12/1977 | Fasano |
| 4,073,200 A | 2/1978 | Plate et al. |
| 4,249,646 A | 2/1981 | Roberts |
| 4,270,634 A | 6/1981 | Matsuzaki |
| 4,296,845 A | 10/1981 | Roberts |
| 4,303,148 A | 12/1981 | Iwasaki |
| 4,337,851 A | 7/1982 | Pringle |
| 4,445,597 A | 5/1984 | Baltare |
| 4,452,347 A | 6/1984 | Dozier |
| 4,621,713 A | 11/1986 | Carre |
| 4,678,067 A | 7/1987 | Thompson |
| 4,747,882 A | 5/1988 | Schwartz et al. |
| 4,782,923 A | 11/1988 | Yamazaki |
| 4,784,244 A | 11/1988 | Carre |
| 4,844,212 A | 7/1989 | Rodino et al. |
| 4,854,423 A | 8/1989 | Evans et al. |
| 4,858,729 A | 8/1989 | Crewson et al. |
| 4,886,146 A | 12/1989 | Copp |
| 4,887,698 A | 12/1989 | Hunt et al. |
| 4,919,236 A | 4/1990 | Karlsson et al. |
| 4,919,237 A | 4/1990 | Yamazaki |
| 5,002,159 A | 3/1991 | Brix et al. |
| 5,010,781 A | 4/1991 | Kirk et al. |
| 5,038,898 A | 8/1991 | Inoue |
| 5,038,899 A | 8/1991 | Weiler |
| 5,125,484 A | 6/1992 | Inoue |

(Continued)

FOREIGN PATENT DOCUMENTS

DE  10004058 A1  8/2001

(Continued)

OTHER PUBLICATIONS

Third Party Submission Under 37 CFR 1.99 dated Jul. 5, 2011, pp. 1-3.

(Continued)

*Primary Examiner* — Robert A Siconolfi
*Assistant Examiner* — Vu Q Nguyen
(74) *Attorney, Agent, or Firm* — Dobrusin & Thennisch PC

(57) ABSTRACT

The present invention is predicated upon improved vehicle brake assemblies, parking brake assemblies, parking brake actuating mechanisms, or combinations thereof, having simplified attachment features and for assembling a brake cable within the parking assembly with substantially limited or no visual access therein.

20 Claims, 9 Drawing Sheets

U.S. PATENT DOCUMENTS

| | | |
|---|---|---|
| 5,142,935 A | 9/1992 | Carr |
| 5,174,170 A | 12/1992 | Kato et al. |
| 5,180,037 A | 1/1993 | Evans |
| 5,305,861 A | 4/1994 | Kobayaski |
| 5,311,793 A | 5/1994 | Panek et al. |
| 5,322,145 A | 6/1994 | Evans |
| 5,360,086 A | 11/1994 | Charmat |
| 5,400,882 A | 3/1995 | Weiler et al. |
| 5,404,971 A | 4/1995 | Hayakawa |
| 5,529,149 A | 6/1996 | Johannesen et al. |
| 5,662,004 A | 9/1997 | Osborn et al. |
| 5,720,367 A | 2/1998 | Evans |
| 5,927,895 A | 7/1999 | Watanabe |
| 5,957,247 A | 9/1999 | Zylstra et al. |
| 5,964,324 A | 10/1999 | Maehara |
| 6,059,077 A | 5/2000 | Maehara |
| 6,119,833 A | 9/2000 | Maehara et al. |
| 6,131,711 A | 10/2000 | Maehara |
| 6,186,294 B1 | 2/2001 | Maehara |
| 6,234,281 B1 | 5/2001 | Sherman et al. |
| 6,241,051 B1 | 6/2001 | Ohnishi et al. |
| 6,286,643 B1 | 9/2001 | Maehara |
| 6,290,036 B1 | 9/2001 | Maehara |
| 6,318,207 B1 | 11/2001 | Asai et al. |
| 6,321,889 B1 | 11/2001 | Maehara |
| 6,328,391 B1 | 12/2001 | Iwata et al. |
| 6,360,852 B1 | 3/2002 | Sherman, II et al. |
| 6,412,609 B2 | 7/2002 | Asai |
| 6,435,317 B2 | 8/2002 | Tanaka et al. |
| 6,454,062 B1 | 9/2002 | Arita et al. |
| 6,464,046 B1 | 10/2002 | DeVecchi |
| 6,490,946 B2 | 12/2002 | Ikeda |
| 6,523,652 B2 | 2/2003 | Ikeda |
| 6,581,729 B1 | 6/2003 | Moriwaki |
| 6,651,782 B2 | 11/2003 | Asai et al. |
| 6,666,302 B2 | 12/2003 | Mizuno et al. |
| 6,679,354 B1 | 1/2004 | Sherman, II |
| 6,681,902 B1 | 1/2004 | Siekas et al. |
| 6,715,378 B1 | 4/2004 | Nakao |
| 6,732,840 B2 | 5/2004 | Ikeda et al. |
| 6,776,554 B2 | 8/2004 | Acciacca |
| 6,817,450 B2 | 11/2004 | Tatsumi et al. |
| 6,962,241 B2 | 11/2005 | Ikeda |
| 6,971,816 B2 | 12/2005 | Miyagawa et al. |
| 7,044,275 B2 | 5/2006 | Maehara |
| 7,070,025 B2 | 7/2006 | Maehara |
| 7,093,695 B1 | 8/2006 | Boyle |
| 7,434,668 B2 | 10/2008 | Fujiyama |
| 7,490,702 B1 | 2/2009 | Schmandt |
| 7,575,104 B2 | 8/2009 | Ikeda et al. |
| 7,575,105 B2 | 8/2009 | Lumpkin |
| 7,730,805 B2 | 6/2010 | Nichols |
| 7,815,018 B2 | 10/2010 | Ikeda |
| 2002/0002870 A1 | 1/2002 | Ikeda |
| 2004/0055833 A1 | 3/2004 | Tatsumi |
| 2005/0145451 A1 | 7/2005 | Kelly et al. |
| 2006/0027712 A1 | 2/2006 | Carrera |
| 2007/0034461 A1 | 2/2007 | Ikeda |
| 2007/0227837 A1 | 10/2007 | Barbosa et al. |
| 2008/0067020 A1 | 3/2008 | Barbosa et al. |
| 2008/0149434 A1 | 6/2008 | Barbosa et al. |
| 2010/0147638 A1 | 6/2010 | Ikeda |

FOREIGN PATENT DOCUMENTS

| | | |
|---|---|---|
| EP | 1099874 A2 | 5/2001 |
| EP | 1234995 A | 8/2002 |
| EP | 1241370 A | 9/2002 |
| EP | 1265001 A | 12/2002 |
| FR | 2778712 A | 11/1999 |
| JP | 6-337027 A | 12/1994 |
| JP | 2000108855 A | 4/2000 |
| JP | 2000219122 A | 8/2000 |
| JP | 2000274465 A | 10/2000 |
| JP | 2001140958 A | 5/2001 |
| JP | 2001-254721 A | 9/2001 |
| JP | 2001254721 A | 9/2001 |
| JP | 2001-349359 A | 12/2001 |
| JP | 2001-349360 A | 12/2001 |
| JP | 2004-293643 A | 10/2004 |
| JP | 2004293643 A | 10/2004 |
| JP | 2005-337327 A | 12/2005 |
| JP | 2006-322563 A | 11/2006 |
| JP | 2008-020010 A | 1/2008 |

OTHER PUBLICATIONS

European Search Report, dated Aug. 27, 2007, Application No. 07006257.5.

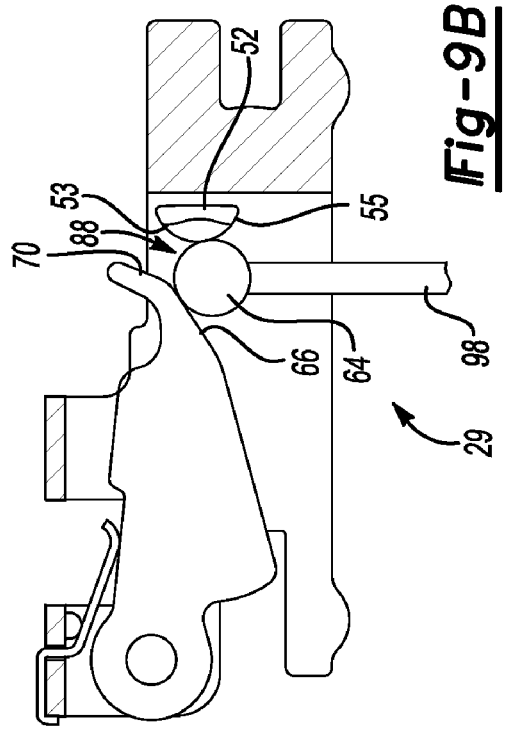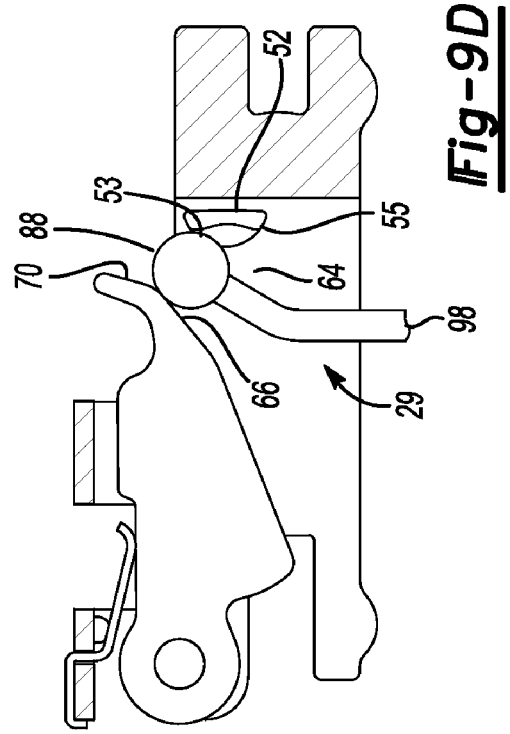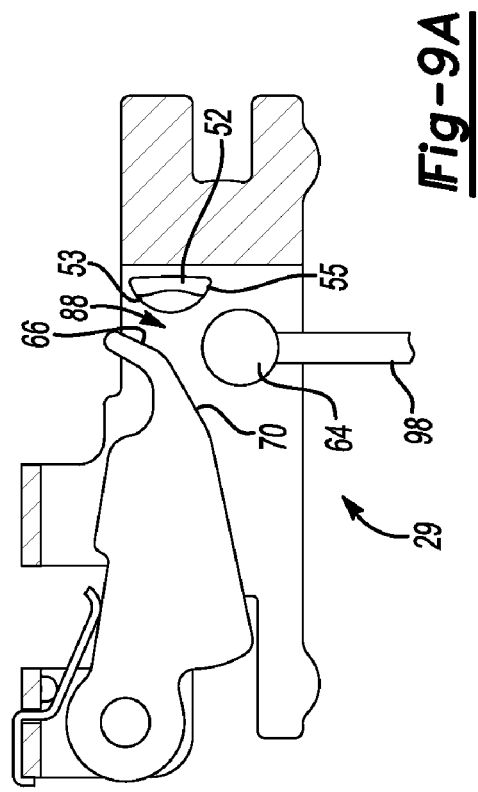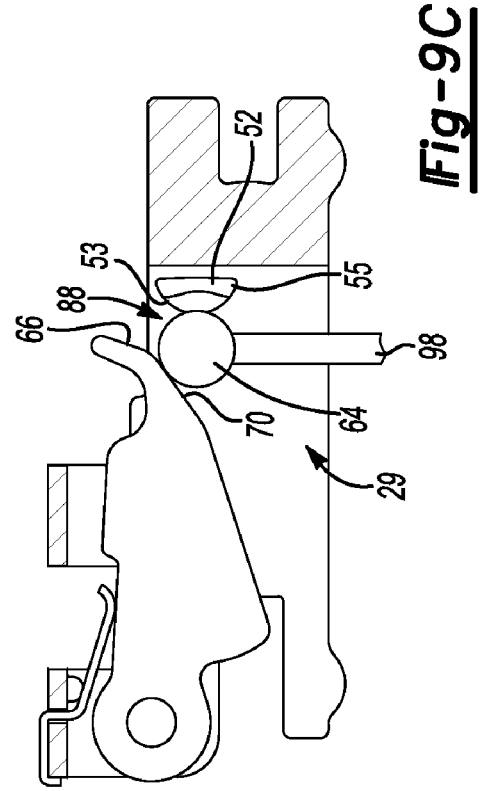

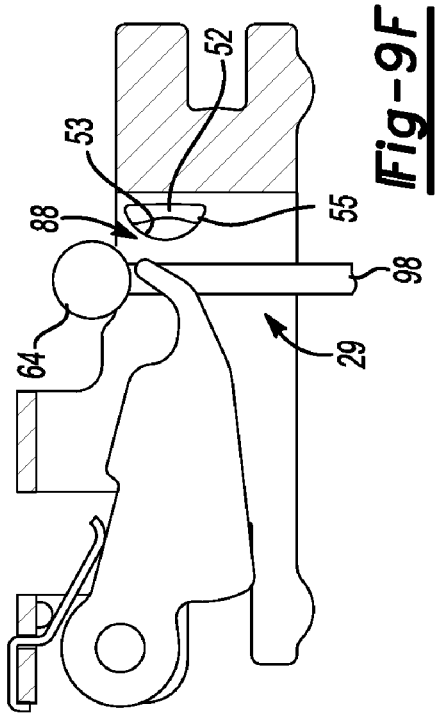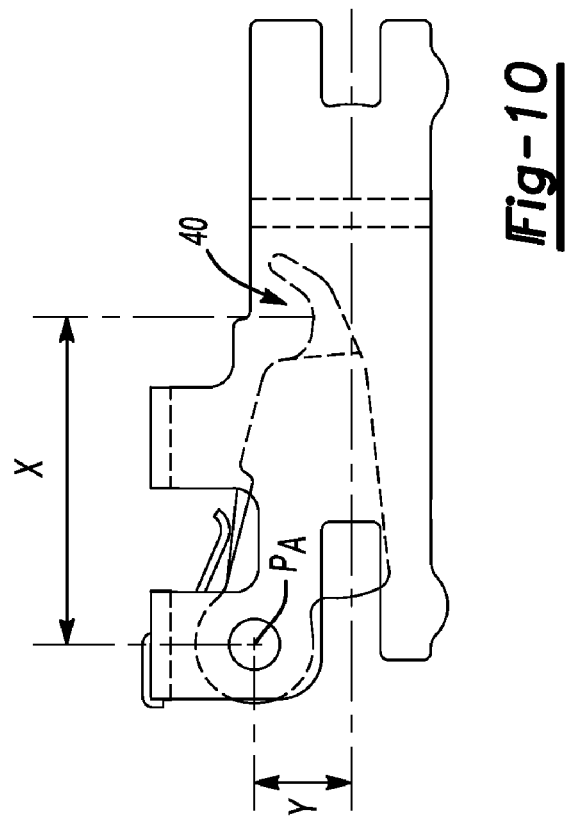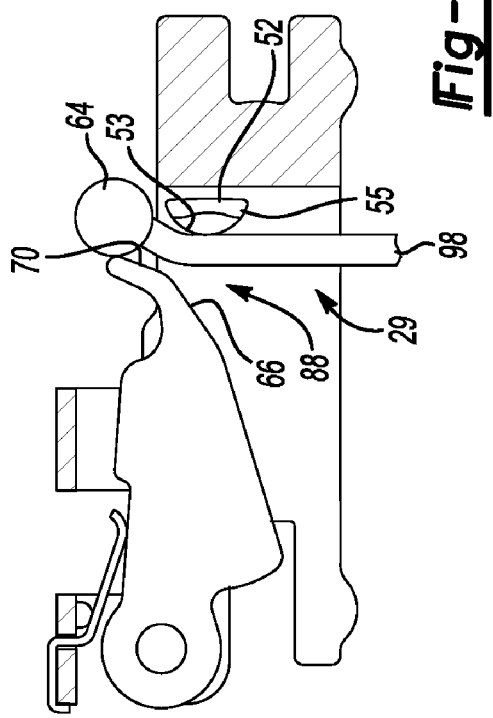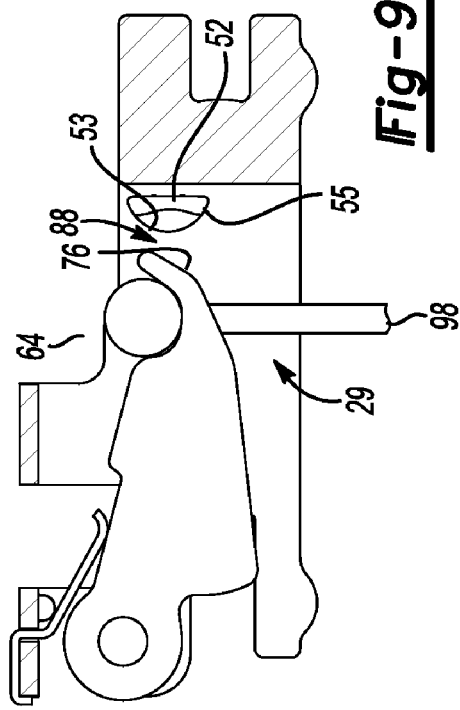

LEVER ASSEMBLY FEATURING BLIND CABLE ASSEMBLY

FIELD OF THE INVENTION

The present invention is predicated upon an improved system and method for providing a parking brake assembly and more specifically a parking brake actuating mechanism.

BACKGROUND OF THE INVENTION

In the field of automotive manufacturing, parking brake assemblies are commonly used to prevent movement of a vehicle. In a typical parking brake assembly, an operator engagement feature, such as a pedal, lever or otherwise, is provided for causing engagement and disengagement of a parking brake actuating mechanism. Typically the operator engagement feature is remotely located and attached to the parking brake actuating mechanism, such as through a linkage (e.g. cable, wire, or otherwise), for causing movement of one or more components of the actuating mechanism. Through this movement and the configuration of the parking brake actuating mechanism, the shoes or pads of the vehicle braking system move to frictionally engage a corresponding component, such as a brake drum, rotor or otherwise.

In one particular application, a parking brake assembly may include a drum-in-hat brake system. In this application, the assembly commonly includes a parking brake actuating mechanism linkably attached to an engagement feature and configured to radially move the brake shoes outwardly against an interior surface of a brake drum, in response to operator input. Upon release of the actuating mechanism, the engagement feature returns to an original position thereby allowing the brake shoes to return to an original position through one or more springs associated with the drum brake system.

In another particular application, assembly of the linkage (e.g., brake cable) to typical actuating mechanisms is problematic especially after the brake drum has been installed. In such situations, there may be limited or no visual access to the inside of the brake assembly (e.g., so called "blind" cable assembly). As a result, the installation of the brake cable may be additionally difficult, time consuming and limited to specific manufacturing steps for assembly thereof, which can add cost to the manufacture of the vehicle and therefore to the consumer.

Examples of parking brake assemblies can be found in U.S. Pat. Nos. 1,913,156, 2,118,188, 4,678,067, 4,844,212, 4,887,698, 5,400,882, 5,529,149, 5,957,247, 6,412,609, 6,464,046, and 6,666,302, all incorporated by reference for all purposes. The present invention improves on these parking brake assemblies as shown and described herein.

SUMMARY OF THE INVENTION

The present invention seeks to improve upon prior brake systems and particularly the attachment of brake cable assemblies thereof by providing an improved actuating mechanism design having a casing with at least one interior wall structure and an engagement portion of a lever with at least one chamfered wall. In one aspect, the present invention provides an actuating mechanism that includes a casing, a lever, and a biasing member. The longitudinally extending casing includes at least one interior wall structure that generally extends along a transverse axis. The lever extends along a longitudinal axis and is located generally opposing the at least one interior wall structure with a gap, therebetween. The lever includes a first portion pivotally engaging the casing and an engagement portion configured for receiving a brake cable that has an end and a body. The engagement portion includes an interior wall portion and an exterior wall portion. The biasing member is fixedly secured to the casing and juxtaposed to an engaging surface of the lever on which a return force bears. Upon the end of the brake cable contacting the exterior wall portion of engagement portion of the lever, the end of the brake cable rotates the lever upward and generally against the return force of the biasing member. Upon the end of the brake cable rotating the lever to an extended position, the gap increases to a width greater than the end of the brake cable such that the end of the brake cable extends through the gap and becomes seated on the interior wall portion of the engagement portion of the lever.

In another aspect, the present invention contemplates an actuating mechanism including a casing, a lever, and a biasing member. The casing includes longitudinally extending first and second walls, each has an interior face and an exterior face. The first and second walls converge at a first end to form at least one interior wall structure that generally extends along a transverse axis and is displaced inward relative to the interior face of a central portion of at least one of the first and second walls. The at least one interior wall structure has a lower wall portion configured to direct the end of the brake cable towards the engagement portion of the lever and an upper wall portion configured to direct the end of the brake cable away from the engagement portion of the lever. The lever extends along a longitudinal axis and includes a first end pivotally engaging the casing and an engagement portion configured for receiving a brake cable that has an end and a body. The engagement portion has a shaped profile configured for receiving an end of a brake cable and includes an interior wall portion and an exterior wall portion. The exterior wall portion is located generally opposing the at least one interior wall structure with a gap, therebetween. The exterior wall portion includes a first chamfered wall that defines a first chamfered angle relative to the longitudinal axis of the lever that is configured for directing the end of the brake cable towards the interior wall structure and into the gap. The first chamfered angle ranges from about 35 to about 75 degrees relative to the longitudinal axis of the lever. The biasing member has a first end portion fixedly secured to the casing and a second end portion juxtaposed to an engaging surface of the lever on which a return force bears. The upper wall portion of the at least one interior wall structure directs the end of the brake cable away from the engagement portion of the lever so that the engagement portion of the lever is generally free to rotate downwards. The end of the brake cable rotates the lever towards an extended position, the upper wall portion of the at least one interior wall structure directs the end of the brake cable away from the engagement portion of the lever and the gap increases to a width greater than the end of the brake cable so that the engagement portion of the lever is generally free to rotate downwards. The end of the brake cable extends through the gap, the end of the brake cable becomes seated on the interior wall portion of the engagement portion of the lever and the biasing member assists in rotating the lever to the retracted position so as to decrease the gap and prevent the end of the brake cable from returning through the gap.

In another aspect, the present invention contemplates an actuating mechanism including a casing, a lever, and a biasing member. The casing includes longitudinally extending first and second walls, each has a free end portion, a central portion, and an integral end portion that have an interior face and an exterior face. The first and second walls converge about the integral end portion to form at least one interior wall structure that generally extends along a transverse axis, and a first exterior distal portion. The at least one interior wall structure includes a first interior wall structure about the first wall and a second interior wall structure about the second wall. The first and second interior wall structures have a generally arcuate boss portion that is displaced inward relative to the interior face of the central portion of first and second walls, the generally arcuate boss portion has a lower wall portion that defines a first angle relative to the transverse axis of casing that is configured to direct the end of the brake cable towards the engagement portion of the lever, the first angle ranging from about 5 to about 40 degrees relative to the transverse axis of the casing and an upper wall portion that defines a second angle relative to the transverse axis of the casing that is configured to direct the end of the brake cable away from the engagement portion of the lever, the second angle ranging from about 30 to about 70 degrees relative to the transverse axis of the casing. The lever extends along a longitudinal axis and between the first and second walls of the casing and includes a first end portion pivotally engaging the free end portion of the casing and an engagement portion configured for receiving a brake cable having an end and a body. The first end portion and the engagement portion has opposing exterior faces and an engaging surface. The engagement portion includes a pair of spaced apart members forming a valley into which a portion of the brake cable is received therebetween. The pair of spaced apart members have a hook shaped profile that is defined by an interior wall portion configured for receiving the end of the brake cable and an exterior wall portion has a first chamfered wall that defines a first chamfered angle relative to the longitudinal axis of the lever. The first chamfered angle is configured for directing the end of the brake cable towards the interior wall structure. The first chamfered angle ranges from about 35 to about 75 degrees relative to the longitudinal axis of the lever. The exterior wall portion further has a second chamfered wall that defines a second chamfered angle relative to the longitudinal axis of the lever. The second chamfered angle is configured for directing the end of the brake cable towards the interior wall structure. The second chamfered angle ranges from about 5 to about 40 degrees relative to the longitudinal axis of the lever. The biasing member has a first end portion that is fixedly secured to an upper wall that extends from at least one of the first and second walls of the casing and a second end portion juxtaposed to the engaging surface of the lever on which a return force bears. The lower wall portion of the at least one interior wall structure directs the end of the brake cable into the gap and into contact with the exterior wall portion of the engagement portion of the lever so that upon contact with the exterior wall portion of the engagement portion, the end of the brake cable rotates the lever from the retracted position of the lever upwards and generally against the return force of the biasing member. The pair of spaced apart members include a first member that is located generally opposing the first interior wall structure and a second member that is located generally opposing the second interior wall structure, both with gaps, therebetween. The first and second walls are spaced apart in the free end portion of the casing and include a first aperture configured for receiving a pin so as to pivotally engage a second aperture about the first end portion of the lever. The upper wall of the casing extends generally perpendicularly to the first and second walls of the casing. The lower wall portion of the boss portion directs the end of the brake cable into the gap and into contact with the exterior wall portion of the engagement portion of the lever so that upon contact with the exterior wall portion of the engagement portion, the end of the brake cable rotates the lever from a retracted position of the lever upwards and generally against the return force of the biasing member. The upper wall portion of the boss portion directs the end of the brake cable away from the engagement portion of the lever so that the engagement portion of the lever is generally free to rotate downwards. When the end of the brake cable rotates the lever towards an extended position, the upper wall portion of the at least one interior wall structure directs the end of the brake cable away from the engagement portion of the lever and the gap increases to a width greater than the end of the brake cable so that the engagement portion of the lever is generally free to rotate downwards. The end of the brake cable extends through the gap, the end of the brake cable becomes seated on the interior wall portion of the engagement portion of the lever and the biasing member assists in rotating the lever to the retracted position so as to decrease the gap and prevent the end of the brake cable from returning through the gap.

In yet another aspect, any of the aspects of the present invention may be further characterized by one or any combination of the following features: the at least one interior wall structure includes a boss portion that is displaced outward relative to an interior face of the casing to define an upper wall portion and a lower wall portion, and wherein the lower wall portion of the interior wall structure directs the end of the brake cable towards the exterior portion of the engagement portion and into the gap; the interior wall structure is formed by a least one wall extending along an adjacent first wall of the casing such that the profile of the at least one wall includes the lower wall portion that defines a first angle relative to the transverse axis of casing that is configured to direct the end of the brake cable towards the engagement portion of the lever, the first angle ranging from about 5 to about 40 degrees relative to the transverse axis of the casing and the upper wall portion that defines a second angle relative to the transverse axis of the casing that is configured to direct the end of the brake cable away from the engagement portion of the lever, the second angle ranging from about 30 to about 70 degrees relative to the transverse axis of the casing; the engagement portion further includes a pair of spaced apart members forming a valley into which a portion of the brake cable is received therebetween, and wherein the pair of spaced apart members are located generally opposing the at least one interior wall structure of the casing with a gap therebetween; at least one of the pair of spaced apart members is bent outward relative to an exterior face of the first portion of the lever; the upper wall portion of the interior wall directs the end of the brake cable away from the engagement portion of the lever such that a portion of the brake cable body bends along the upper wall portion of the at least one interior wall structure as the end of the brake cable extends into the gap; upon the end of the brake cable being directed through the gap, the brake cable generally straightens so as to position the end of the brake cable generally above the pair of spaced apart members and to position the brake cable body into the valley therebetween; the end of the brake cable is seated along the interior wall portion of the engagement portion as the biasing member returns the lever to the retracted position; the casing at least one longitudinally extending wall and a generally perpendicular upper wall extending from the at least one longitudinally extending wall, the upper wall of casing being configured for securement of a first portion of the biasing member; the upper wall of the casing includes an opening for receiving the biasing member for securement of the first portion of the biasing member to an upper face of the upper wall of the casing; the lower wall portion of the interior wall structure defines a first angle relative to the transverse axis of casing that is configured to direct the end of the brake cable towards the engagement portion of the lever, the first angle ranging from about 5 to about 40 degrees relative to the transverse axis of the casing, the upper wall portion of the interior wall structure defines a second angle relative to the transverse axis of the casing that is configured to direct the end of the brake cable away from the engagement portion of the lever, the second angle ranging from about 30 to about 70 degrees relative to the transverse axis of the casing, or a combination of both; the exterior wall portion of the engagement portion includes a first chamfered wall that defines a first chamfered angle relative to the longitudinal axis of the lever that is configured to direct the end of the brake cable towards the interior wall structure of the casing and into the gap, the first chamfered angle ranging from about 35 to about 75 degrees relative to the longitudinal axis of the lever, a second chamfered wall that defines a second chamfered angle relative to the longitudinal axis of the lever that is configured to direct the end of the brake cable towards the interior wall structure of the casing and into the gap, the second chamfered angle ranging from about 5 to about 40 degrees relative to the longitudinal axis of the lever; or a combination of both; the extended position of the lever is less than 25 degrees relative to the retracted position of the lever; the biasing member is in contact with the engaging surface of the lever or free of contact with the engaging surface of the lever while the lever is in the retracted position; upon the end of the brake cable being directed through the gap and generally above the engagement portion of the lever, the biasing member assists in rotating the lever to the retracted position while decreasing the gap so as to prevent the end of the brake cable from returning through the gap; or any combination thereof.

It should be appreciated that the above referenced aspects and examples are non-limiting as others exist with the present invention, as shown and described herein. For example, any of the above mentioned aspects or features of the invention may be combined to form other unique configurations, as described herein, demonstrated in the drawings, or otherwise.

BRIEF DESCRIPTION OF THE DRAWINGS

FIGS. 9A through 9G illustrate cross-section views of an eighth embodiment according to the teachings of the present invention.

FIG. 10 illustrates a cross-section view of a ninth embodiment according to the teachings of the present invention.

DETAILED DESCRIPTION

In general, the present invention is predicated upon an improved vehicle brake system. More particularly, the present invention is predicated upon an improved parking brake actuating mechanism for improving a parking brake assembly of a vehicle braking system.

In contrast to many of the previous systems, the attachment of the brake cable, more particularly the end of the brake cable, into the actuating mechanism of the present invention solves one or more of the problems previously experienced by providing an improved actuating mechanism that includes one or more surfaces defining one or more profiles used to cause movement of the lever by the end of the brake cable. Accordingly, the end of the brake cable is extended through a gap between the lever and the casing of the actuating mechanism for positioning the end of the brake cable for attachment to the actuating mechanism (e.g., a lever) so as to be generally maintained therein.

The parking brake assembly provides one or more advantages over the prior art by improving the assembly of the parking brake assembly. For example, advantages may be achieved as a result of the unique configuration of the components comprising the parking brake actuating mechanism. In one possible construction, advantages may also be achieved through a desired profile configuration along an interior face of a casing, an exterior face of a lever, or a combination of both, as encountered by an end of a brake cable during a "blind" installation of the brake cable in the parking brake assembly. That is, the present invention makes possible the insertion of the suitable linkages (e.g., brake cable) into the actuating mechanism prior to, during, or after various manufacturing steps of an automotive vehicle in instances when there may be limited or no visual access for the installer to the inside of the parking brake assembly. As such, it is appreciated that the attachment of the brake cable may be accomplished irrespective of the location, the orientation, or otherwise of the actuating member.

Figure 1:
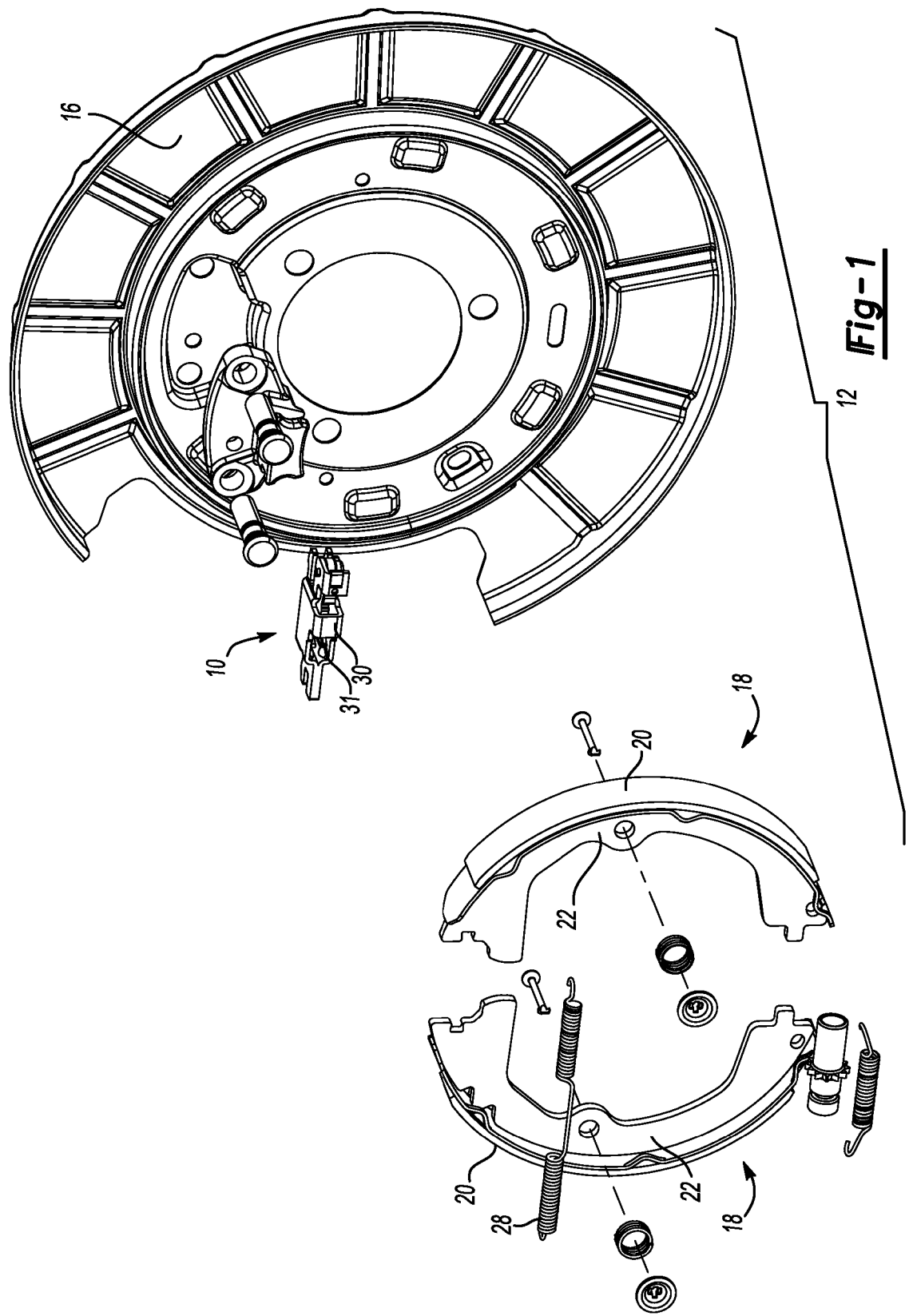
FIG. 1 illustrates an exploded perspective view of a brake assembly including a first embodiment of the present invention.
Figure 2:
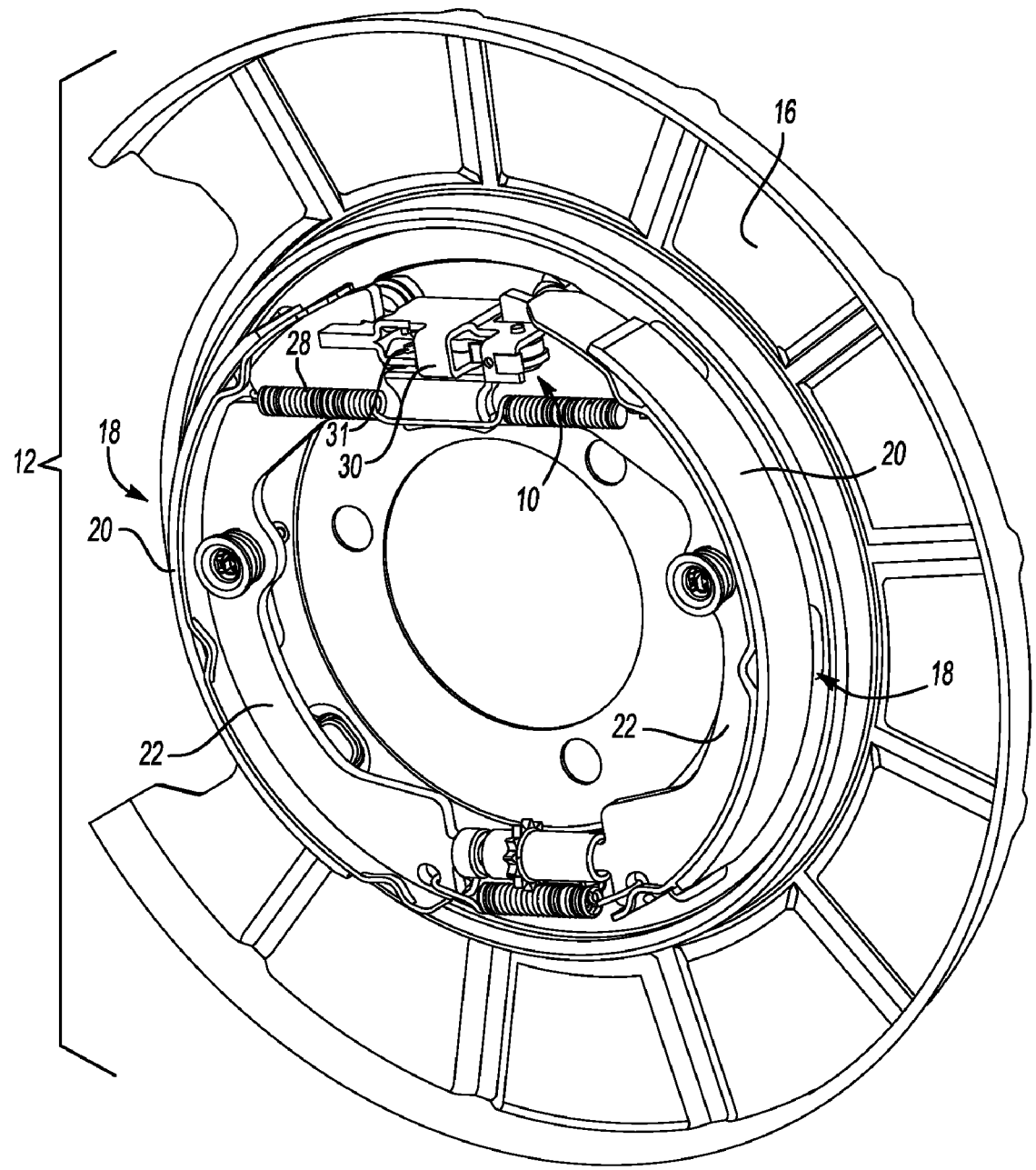
FIG. 2 illustrates a front view of the brake assembly and the embodiment shown in FIG. 1.

In general, referring to FIGS. 1 and 2, the present invention provides a parking brake actuating mechanism 10 for use with a brake assembly 12. The parking brake assembly 12 is adapted for use and more preferably to be incorporated into one or more braking systems of a vehicle. Typically, this includes a single brake assembly associated with a wheel of an axle, but of course may extend to more than one including all of the vehicle wheels.

The brake assembly 12 may include any brake system used with a vehicle. Preferably, at least one of the brake assemblies includes a parking brake assembly therewith. The brake assembly may include caliper brakes, drum brakes or otherwise. Such braking systems include one or more brake pads or shoes configured for engagement with a rotating member of the vehicle wheel, such as brake rotor or drum. The actuation of the brake system components generally involves the hydraulic use of brake fluid to fluidly apply a load against a brake component, such as a piston, which is further connected to one or more components configured to cause or otherwise move the braking elements used to engage the moving components of the wheel. In contrast, the actuation of the parking brake assembly or mechanism typically utilizes mechanical means such as levers, cables or the like.

In one particular advantageous application, the parking brake assembly may be utilized with a drum brake assembly, and particularly a drum in hat assembly. The drum brake assembly may include a housing 16 for the mounting of various components of the brake assembly and optionally attachment to the knuckle or axle of the vehicle. In one configuration, the housing 16 comprises a mounting plate formed through a stamping or casting procedure, such as commonly done in shaping metal components.

It should be appreciated that other components associated with a typical brake drum assembly may be utilized and/or otherwise incorporated with the braking system of the present invention. Such additional features may be found in copending commonly owned U.S. patent application Ser. No. 11/522,552, filed on Sep. 14, 2006 and Ser. No. 11/942,082, filed on Nov. 19, 2007. Such features may also be found in commonly owned U.S. Pat. Nos. 7,070,025, 7,044,275, 6,732,840, 6,679,354, 6,454,062, 6,328,391, 6,321,889, 6,290,036, 6,286,643, 6,186,294, 6,131,711, 6,119,833, 6,059,077, 5,964,324, 5,404,971, 5,305,861, 5,125,484, 5,038,898, 4,919,236, 4,782,923, 4,303,148, 4,270,634, or otherwise, all entirely incorporated herein for all purposes.

With reference to FIGS. 3A through 6C, the teachings of the present invention provide the actuating mechanism 10 for the brake assembly 12 having a casing 31, a biasing member 82 (e.g., a leaf spring), and a lever 30 (e.g., "cross pull" type lever, "forward pull" type lever, or otherwise) that is adapted to receive a linkage 29 (e.g., brake cable such as a cable having an enlarged cable end) for assembly of the braking assembly. It is appreciated that this configuration may be employed in a method of engaging the brake cable with the brake assembly (e.g., actuating mechanism) prior to, during, or after various steps in manufacturing of an automotive vehicle, when there may be limited or no visual access for the installer to the inside the brake assembly during installation thereof.

Though described herein and throughout as a preferred cable for the brake linkage, other linkages may be substituted therefor. The reference to cable is not intended as limiting. Desirably, the casing 31, the lever 30, or both include a profile that may be configured to direct the brake cable 29 and more particularly a first end 64 of the brake cable 29, which extends from a body 98 of the brake cable 29 into the actuating mechanism 10 for engagement with an engagement portion of the lever 30 to generally maintain the first end 64 of the brake cable 29 therein. This can be accomplished according to the present teachings for example, by configuring one or more walls of the casing 31 with an interior wall structure 52 (e.g., a boss), FIGS. 4D and 5B profile having a specific series of surfaces into which the first end 64 of the brake cable 29 may be received. Optionally or as an alternative, this can also be accomplished according to the present teachings for example, by configuring the profile of the engagement portion (e.g., a hook) of the lever 30, FIGS. 4D and 5B, with a series of chamfers into which the first end 64 of the brake cable 29 is received. Accordingly, the profile of the interior wall structure of the casing, the engagement portion of the lever, or a combination of both may be configured to define one or more angles that advantageously direct the first end 64 of the brake cable 29 into position within the actuating mechanism for engagement therewith.

Referring to FIGS. 3A through 5C, several configurations of the actuating mechanism 10 are shown. In general, the actuating mechanism includes a casing 31 that engages directly or indirectly an intermediate structure lever 30 and the braking elements 18 for driving the braking elements into braking engagement with a brake drum or other braking surface. The casing 31 has a longitudinal axis $L_A$ and includes one or more walls that pivotally engage the lever 30. For example, the casing 31 includes a first wall 32 and a second wall 34 longitudinally extending and at least partially spaced over its length such that a cavity 80 is defined therebetween. It is appreciated that the first and second walls 32, 34 may be generally symmetrical, though not required. It is further appreciated that the one or more walls may be formed from a plurality of individual plate members or may be one integral plate (e.g., two or more generally opposing and optionally contacting wall members). Optionally or as an alternative, it is contemplated that the casing 31 may include a single wall (e.g., a single longitudinally extending plate).

When included, the first and second walls 32, 34 may define a configuration that forms a generally hollow portion. It is appreciated that the first and second walls 32, 34 may include an exterior face, an interior face, an upper portion, a lower portion, a central portion, a free end portion, and an integral end portion. The casing 31 may further include opposing distal portions and an aperture 36 extending through the first wall 32 and the second wall 34 for defining a pivot axis. The first and second walls 32, 34, may include generally flat surfaces (e.g., along the exterior face, the interior face, or both), though not required. In one aspect, it is appreciated that one or both of the first and second walls 32, 34 may include a bend 58 for displacing (e.g., converging or otherwise) at least one of the first and second walls 32, 34 relative to other. For example, the first and second walls 32, 34 may converge into a contacting relationship so as to form the interior wall structure 52 and a first distal portion at the integral end portion of the casing.

Preferably, the interior wall structure (profile) 52 that may be configured for assisting in the attachment of the brake cable 29. The interior wall structure 52 may be formed by at least one additional wall (FIGS. 5A through 5C), by deforming (e.g., displacing, bending, cutting, or otherwise) a portion of the one or more walls (e.g., the first wall 32, the second wall 34, or both), or otherwise. It is appreciated in one embodiment that the interior wall structure 52, may include one or more generally flat portions or may be entirely flat (e.g., about 90° relative to the longitudinal axis). Optionally or alternatively, the interior wall structure 52 may be a separate component (e.g., a projection, a depression, a wall, a plate, or otherwise), fixedly secured to the casing 31 so as to vary the interior face profile of the casing 31.

The interior wall structure 52 may include a shaped profile having a boss 90 that may extend from a base portion of the interior wall structure 52 and may be generally arcuate, flat, pointed, or otherwise, or any combination thereof. The boss 90 may be defined by generally the deepest portion of the interior wall structure relative to the interior face of the first or second wall 32, 34 (e.g., the base portion of the interior wall structure 52), the interior face of the convergence portion (e.g., the bend) of the one or more walls of the casing, or otherwise. Furthermore, the cross-section of the shaped profile may generally form a shape such as a circle, a semicircle, an oval, a teardrop, a polygon (e.g., a triangle, a diamond, a square, a rectangle, or otherwise), or any combination thereof. Other interior wall structure 52 shapes may be employed as desired. Preferably, the shape of the boss 90 is such that it functions to direct the first end 64 of the brake cable 29 towards the engagement portion 40 of the lever 30, away from the engagement portion 40 of the lever, or a combination of both to attach the first end 64 of the brake cable 29 to the engagement portion 40 of the lever 30.

Figure 3A:
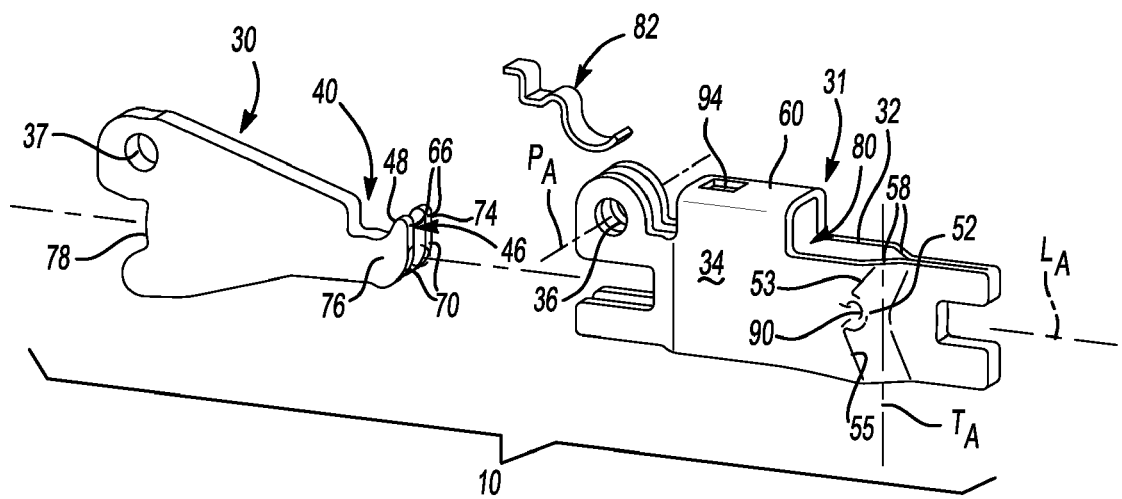
FIGS. 3A and 3B illustrate perspective views of a second embodiment according to the teachings of the present invention.
Figure 3B:
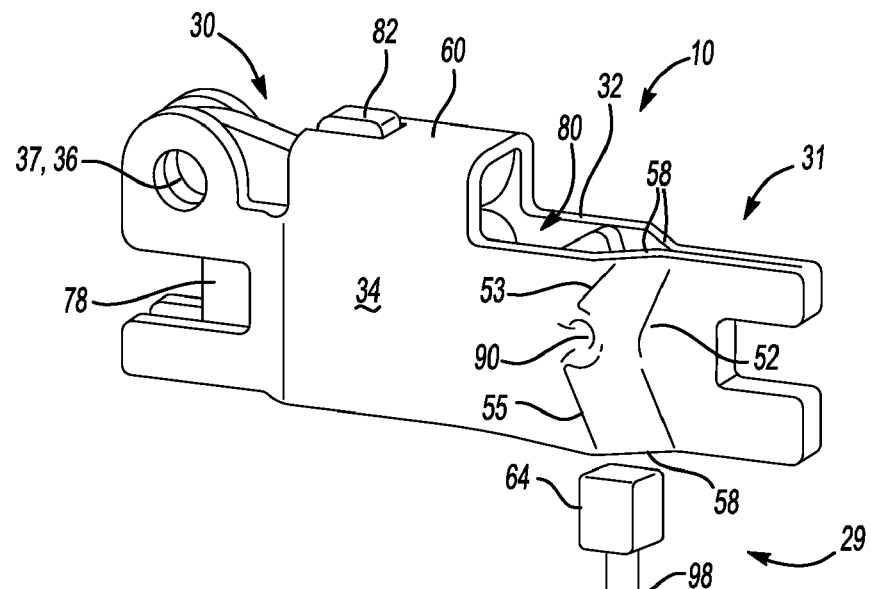
Figure 3C:
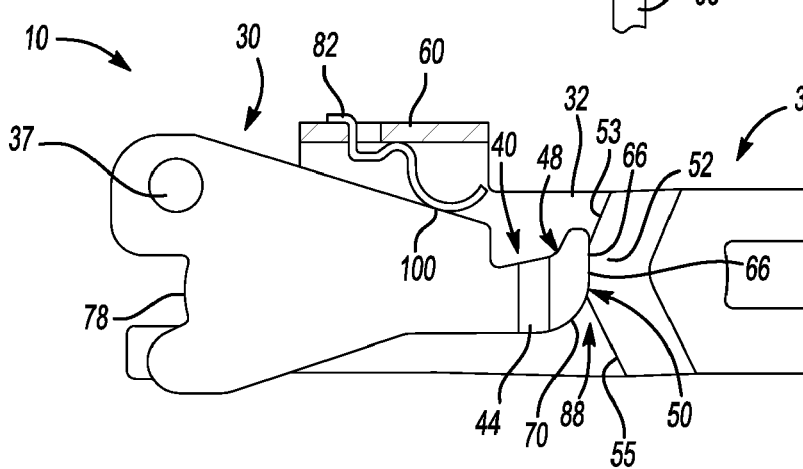
FIG. 3C illustrates a side view of the second embodiment as shown in FIGS. 3A and 3B.
Figure 4A:
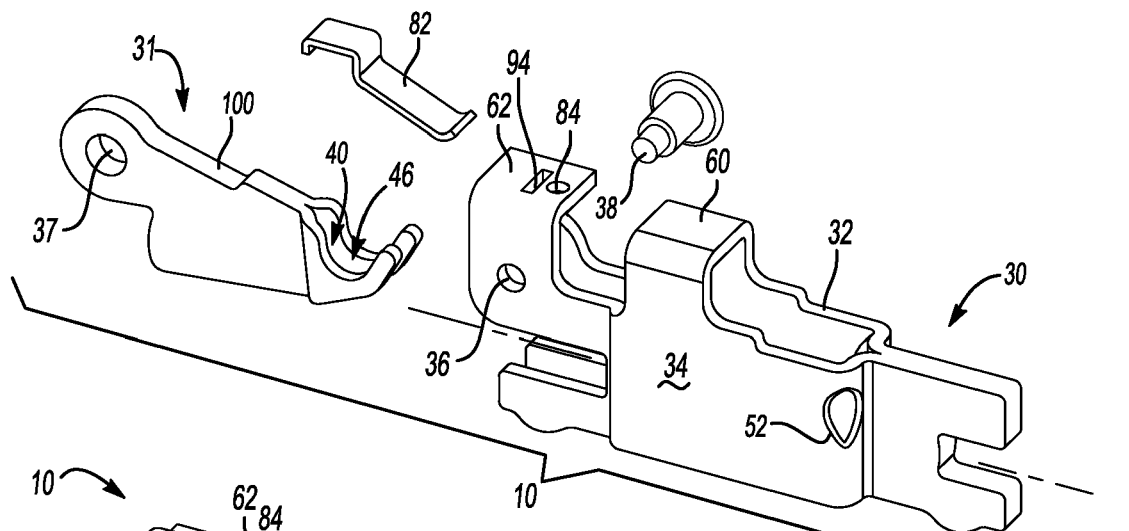
FIGS. 4A and 4B illustrate perspective views of a third embodiment according to the teachings of the present invention.
Figure 4B:
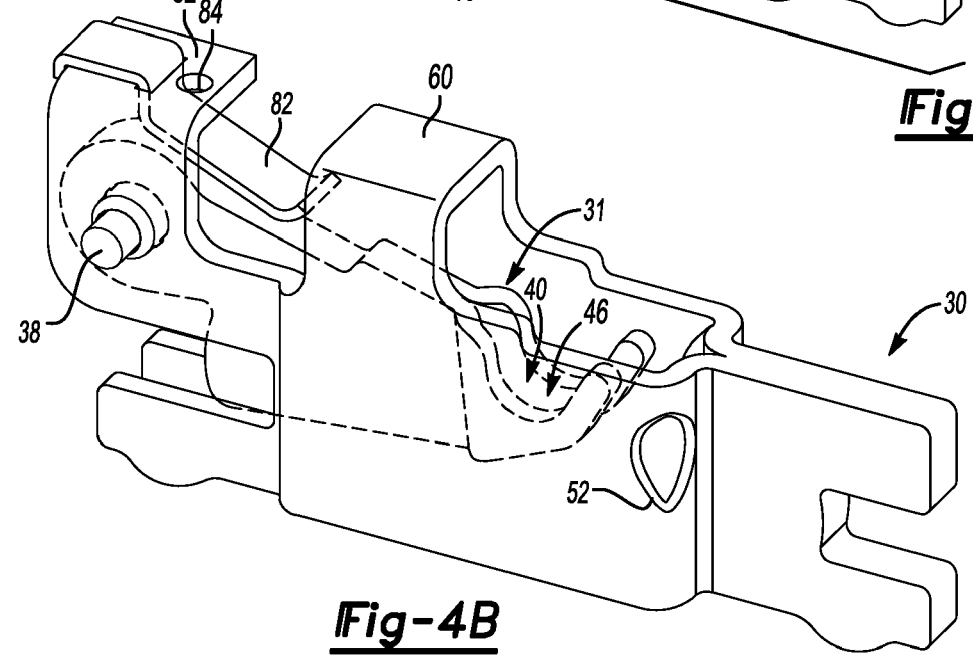
Figure 4C:
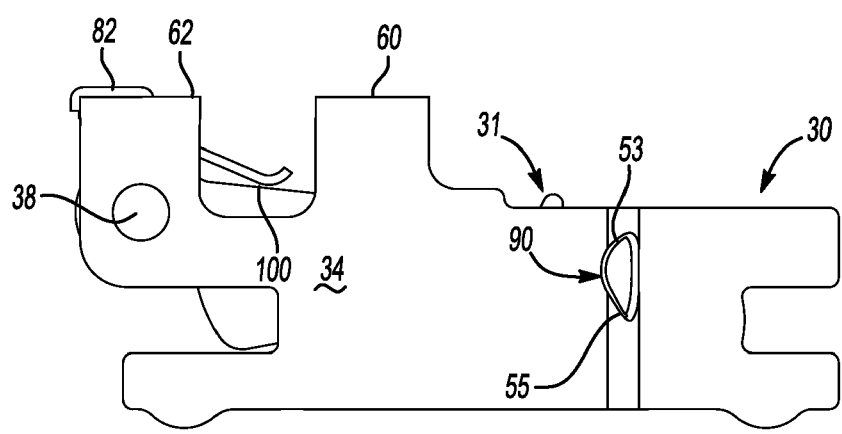
FIGS. 4C through 4F illustrates a cross-section view of the third embodiment shown in FIGS. 4A and 4B.
Figure 4D:
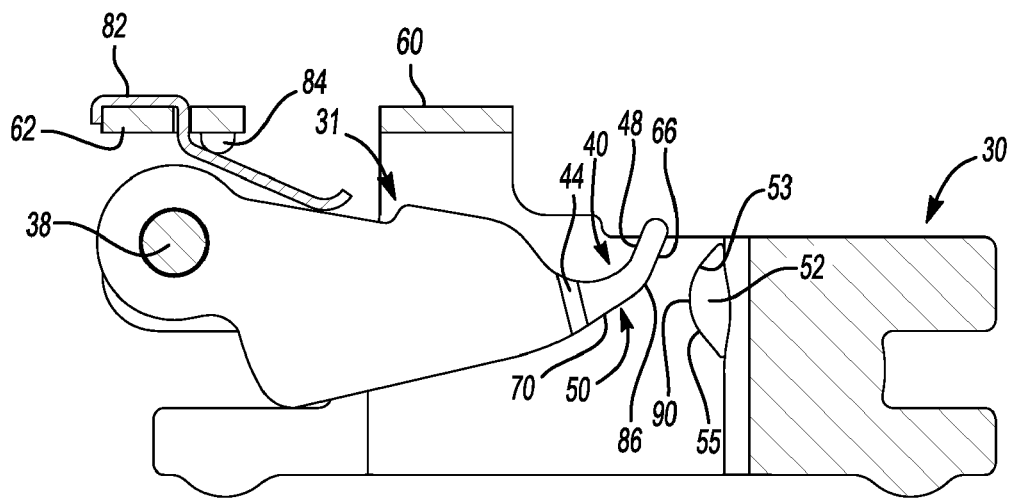
Figure 4E:
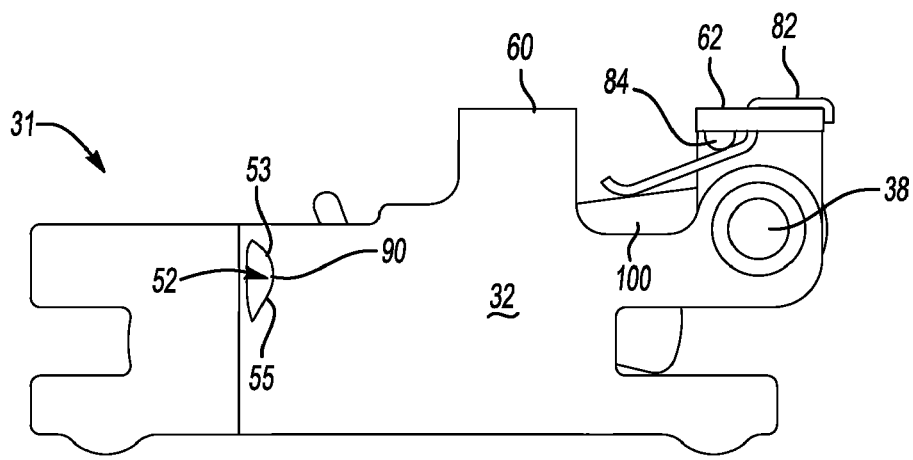
Figure 4F:
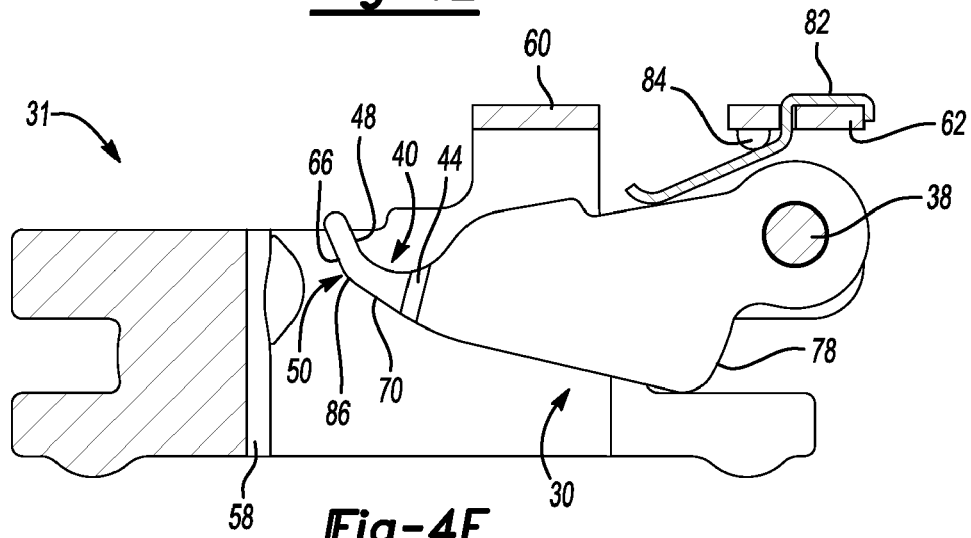
Figure 5A:
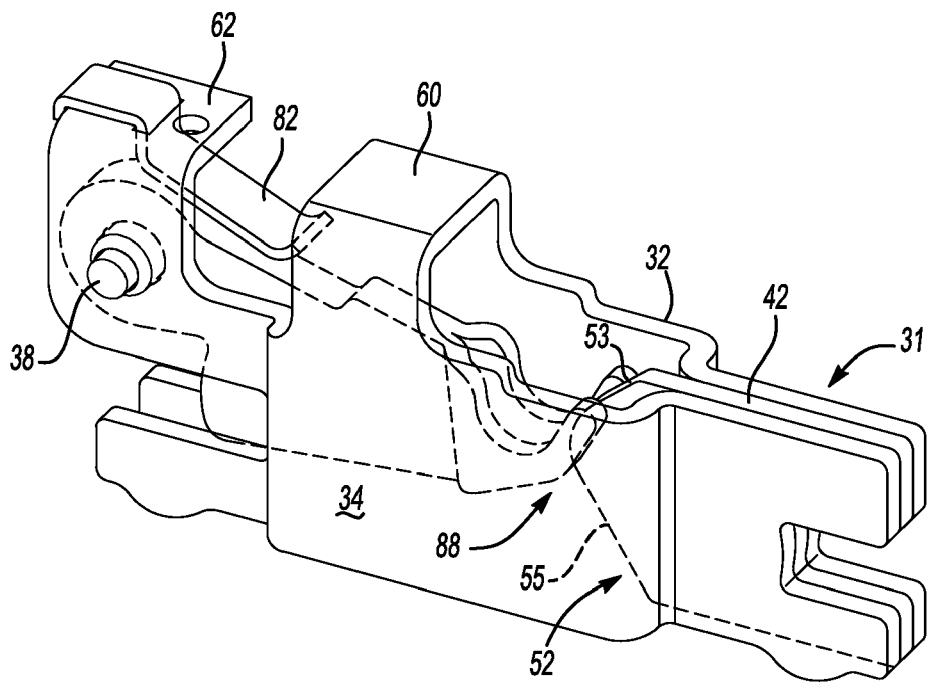
FIG. 5A illustrates a perspective view of a fourth embodiment according to the teachings of the present invention.
Figure 5B:
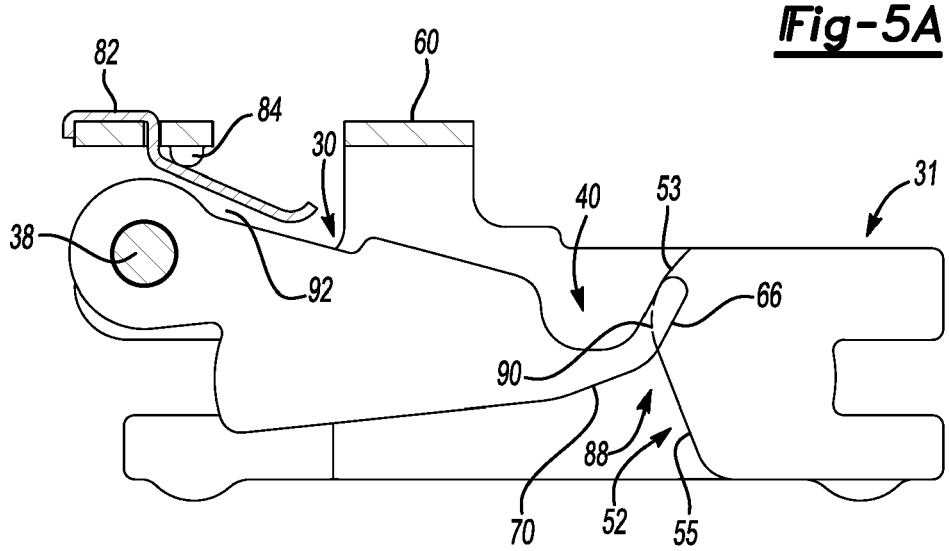
FIG. 5B illustrates a cross-section view of the fourth embodiment shown in FIG. 5A.
Figure 5C:
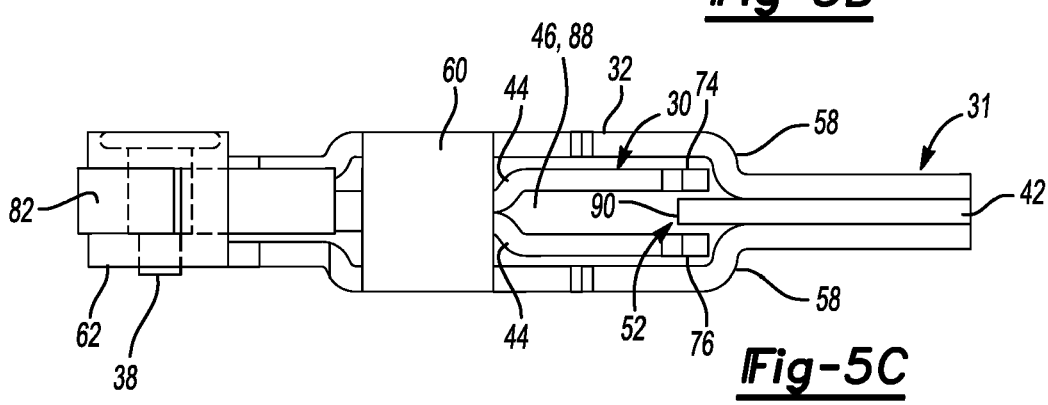
FIG. 5C illustrates a top view of the fourth embodiment shown in FIGS. 5A and 5B.

More specifically, in one exemplary embodiment, as shown in FIGS. 3A through 3C, the first and second walls 32, 34 converge to form an interior wall structure 52 having opposing generally triangular bosses 90 (e.g., cross-section at a base portion) with a generally flat interior face that faces one another. In another exemplary embodiment, as shown in FIGS. 4A through 4F, an interior wall structure 52 includes opposing generally tear-dropped bosses 90 (e.g., cross-section at the base portion) with a generally rounded interior face that faces one another. In yet another embodiment, as shown in FIGS. 5A through 5C, the casing 31 includes the first wall 32 and the second wall 34 that converge along an adjacent wall 42 to form an interior wall structure 52. The adjacent wall 90 includes generally flat exterior faces and an interior face that defines a boss portion 90 that is generally arcuate (e.g., convex). It is appreciated that in forming the boss 90 at least a portion of the exterior face and the interior face may be displaced (e.g., deformed) inward into the cavity 80 of the casing 31. It is further appreciated that the interior wall structure 52 may be formed by a bend 58 (e.g., inward, outward, or a combination of both) relative to the central portion of the casing 31.

Figure 6:
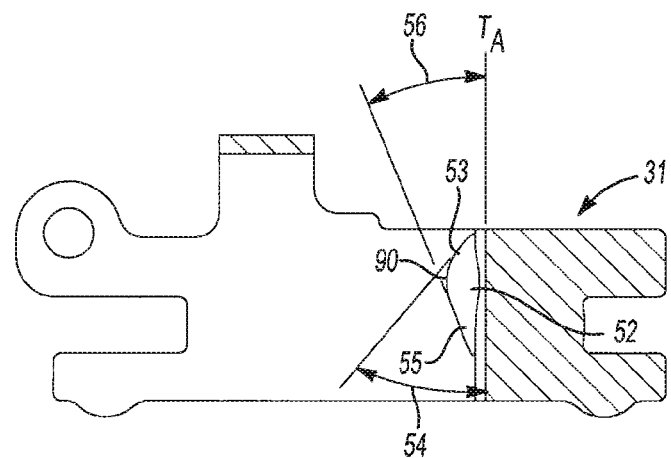
FIG. 6 illustrates a cross-section view of a fifth embodiment according to the teachings of the present invention.

With reference to FIG. 6, to assist in directing the first end 64 of the brake cable 29 towards the engagement portion 40 of the lever 30 for rotation (e.g., upwards or counter-clockwise towards the upper portion of the casing such as against a return force of a biasing member 82, as discussed below) of the lever 30, the interior wall structure 52 may include a lower wall portion 55 having an lower surface (e.g., generally a sloped surface) that defines a first angle 56 relative to a transverse axis $T_A$ of the casing. To assist in directing the first end 64 of the brake cable 29 away from the engagement portion 40 of the lever 30 for rotation (e.g., downwards or clockwise towards the lower portion of the casing such as with the return force of the biasing member 82) of the lever 30, the interior wall structure 52 may also include an upper wall portion 53 having an upper surface (e.g., generally sloped surface) that defines a second angle 54 relative to the transverse axis $T_A$. It is appreciated that the first angle 56 may be at least about 5, and more preferably at least about 10 degrees relative to the transverse axis. Furthermore, the first angle 56 may be less than about 40, and more preferably less than about 30 degrees relative to the transverse axis. For example, the first angle 56 may range from about 5 to about 40, and more preferably from about 10 to about 30 degrees relative to the transverse axis. It is further appreciated that the second angle 54 may be at least about 30, and more preferably at least about 40 degrees relative to the transverse axis. Furthermore, the second angle 54 may be less than about 70, and more preferably less than about 60 degrees relative to the transverse axis. For example, the second angle 54 may range from about 30 to about 70, and more preferably from about 40 to about 60 degrees relative to the transverse axis.

In another aspect, the free end portion may include a second distal portion formed from the spaced apart portions of the first and second walls 32, 34. As shown in one embodiment, the free end portion includes an aperture 36 that may extend through one or both the first and second walls 32, 34. The aperture 36 may be configured to receive a separate component (e.g., pin) for engagement of the lever 30 and pivotal rotation thereof. Optionally or as an alternative, it is appreciated that at least one of the first and second walls 32, 34 may include an integral component such as a projection (not shown) for pivotally engaging the lever 30. In one specific embodiment, the aperture 36 may be located generally in the upper portion of the free end portion through both the first and second walls 32, 34 to define a pivot axis, however it is further appreciated that the aperture 36 or otherwise may be located elsewhere through or on one or both of the first and second walls 32, 34.

The casing 31 may further include one or more walls that extend from and/or between the first and second walls 32, 34. For example, as shown in FIGS. 3A through 5C, the central portion of the casing further includes a first upper wall portion 60 in the upper portion of the first and second walls 32, 34, extending therebetween. As shown in FIGS. 4A through 5C, the free end portion of the casing further includes a second upper wall portion 62 that extends from an upper finger of the second distal portion (e.g., of the second wall 34). The second upper wall portion 62 may include a free end as shown or may further extend to another wall (e.g., the first wall 32, the first upper wall portion 60, or otherwise). When included, the first upper wall portion 60, the second upper wall portion 62, or both, may generally extend perpendicularly to the first and second walls 32, 34. Furthermore, at least one of the first and second upper wall portions 60, 62 may include an opening 94 to receive the biasing member 82 for securement to the respective upper wall portions 60, 62.

The actuating mechanism employs a lever that is readily removable from the casing. The lever 30 may be configured to be linkably attached to the operator engagement feature of the brake assembly 12, via the brake cable 29. The lever may be shaped (e.g. L-shaped, wedge-shaped, or otherwise). Preferably, the lever 30 extends along the longitudinal axis $L_A$ and includes a first end portion for engagement with the free end portion of the casing 31 and a second end portion for engagement with brake cable 29. The first end portion and the second end portion of the lever 30 may further include generally opposing exterior faces and an engaging surface 100. In one embodiment, the lever 30 may be configured with a shaped profile (e.g., a hook) to provide improved transfer of leverage force from the operator engagement feature to the components of the actuating mechanism 10. Advantageously, this shaped profile configuration also aids in securing engagement with linkage 29 as discussed below. Other lever 30 shapes may be employed as desired.

The lever 30 may be positioned for rotation about a pivotal axis $P_A$ relative to the casing 31. Referring to FIGS. 4A and 5C, the pin 38 penetrates the apertures 36, 37 for providing pivotal motion of the lever 30 one or both of the first or second walls 32, 34, when included. During attachment of the brake cable 29 when the lever 30 is in a retracted position FIG. 9A, the lever 30 is positioned generally along the longitudinal axis $L_A$ such that a gap 88 is formed between the engagement portion 40 of the lever 30 and the interior wall structure 52 (e.g., the boss portion 90, when included). It is appreciated that in the retracted position of the lever 30, the gap 88 may be defined by a distance that is generally less than the width of the first end 64 of the brake cable 29. Upon rotation of the lever 30 to the extend position, the gap 88 increase so that first end 64 of the brake cable 29 extends further into the gap 88. The lever 30 continues to rotate (e.g., upwards against the return force of the biasing member 82) so that the gap 88 increase to a distance that becomes generally greater than the width of the first end 64 of the brake cable 29 when in the extended position of the lever 30 FIG. 9E.

Figure 8:
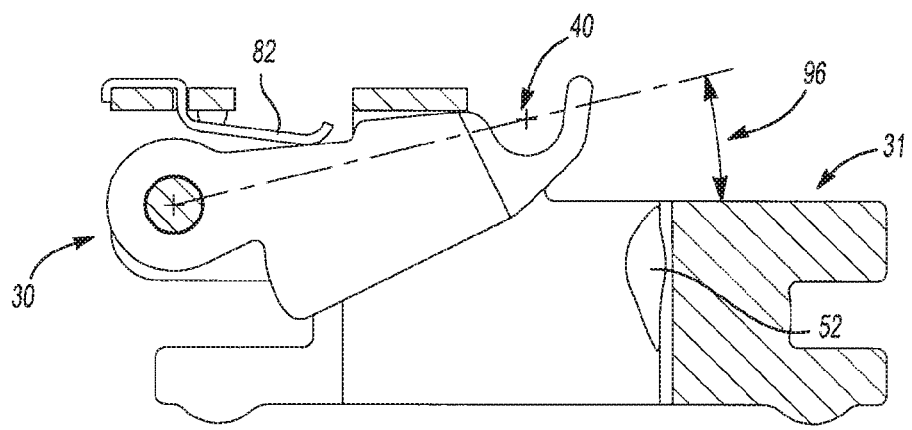
FIG. 8 illustrates a cross-section view of a seventh embodiment according to the teachings of the present invention

With reference to FIG. 8, it is appreciated that the rotation of the lever 30 from the retracted position to the extended position may be defined by a rotation angle 96. The rotation angle 96 may be less than about 30 degrees, and more preferably to less than 20 degrees relative to the longitudinal axis (e.g., from about 0 degrees in the retracted position).

Returning to FIGS. 3A, 4A, and 5A, the first end portion of the lever 30 engages either directly or indirectly the first and second walls 32, 34 of the casing 31, when included through a pivotal engagement along the pivotal axis $P_A$. In the configurations shown in FIGS. 3B, 4A, and 5A, the lever 30 includes an aperture 37 (e.g., generally round, elongated slot, or otherwise) in the first end portion for receiving a pin or other elongated projecting member 38 that extends therethrough for pivotal engagement with the aperture 36 of the first and second walls 32, 34 of the casing 31. It is contemplated, that the projecting member 38 may be associated, connected or formed with, or separate from the casing 31 (e.g., one or both of the first and second walls 32, 34), the lever 30, or a combination of both.

In one exemplary embodiment, the first end of the lever 30 may further include a flange portion 78 in the lower portion of the lever 30 for assisting in the engagement and disengagement of the braking elements 18 relative to the opposing distal portions of the casing 31. The flange portion 78 may be generally displaced relative to the upper portion of first end portion of the lever 30 to form a distal portion similar to the second distal portion of the casing 31 as shown in FIG. 3C. The flange portion 78 may include a contact surface (e.g., generally perpendicular contact surface relative to the longitudinal axis $L_A$ (FIG. 3A) that may be displaced towards the central portion relative to an outer edge of the upper portion of the first end portion as shown in FIG. 4E. It is appreciated that upon activation of the operator engagement feature, the brake cable is displaced thereby rotating the lever 30 such that the contact surface of the flange and/or the distal portions displace the support members 22 of the braking elements 18 to engage the brakes.

In another exemplary embodiment, as illustrated in FIGS. 3B, 4A, and 6A, the lever 30 may include an engagement portion 40 (e.g., a hook portion) for assisting in the attachment to the operator engagement feature or the connecting the brake cable 29 or otherwise thereto as discussed herein. More particularly, the engagement portion 40 may be generally located in the second end portion of the lever 30 and may include an interior wall portion 48 and an exterior wall portion 50. The exterior wall portion 50 extends along the lower face and defines a first profile (e.g., flat, arcuate, or a combination of both) that assists in directing the first end 64 of the brake cable 29 towards the interior wall structure 52 of the casing 31 for the attachment of the connecting brake cable 29, or otherwise. More particularly, the exterior wall portion 50 assists in directing the first end 64 of the brake cable 29 to the interior portion of the engagement portion 40 for attachment therein. The exterior wall portion 50 may one or more surfaces of the lower face such as a first chamfered wall 66. Preferably, the one or more surfaces include the first chamfered wall 66 and a second chamfered wall 70. When included, it is appreciated that the first chamfered wall 66 extends to the second chamfered wall 70 through a chamfered edge 86.

Figure 7:
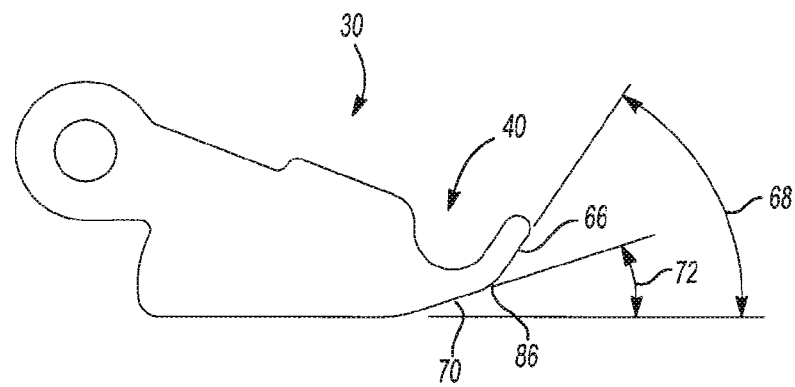
FIG. 7 illustrates a cross-section view of a sixth embodiment according to the teachings of the present invention

As shown in FIG. 7, the first chamfered wall 66 generally defines a first lever angle 68 relative to the longitudinal axis. It is appreciated that the first lever angle 68 may be at least about 35 degrees, and more preferably at least about 45 degrees relative to the longitudinal axis of the lever. Furthermore, the first level angle 68 may be less than about 75 degrees, and more preferably less than about 65 degrees relative to the longitudinal axis of the lever. For example, the first level angle 68 may range from about 35 degrees to about 75 degrees, and more preferably from about 45 degrees to about 65 degrees relative to the longitudinal axis of the lever.

When included, the second chamfered wall 70 of the exterior wall portion 50 generally defines a second lever angle 72 relative to the longitudinal axis of the lever, as shown in FIG. 7. It is appreciated that the second lever angle 72 may be at least about 5 degrees, and more preferably at least about 10 degrees relative to the longitudinal axis of the lever. Furthermore, the second lever angle 72 may be less than about 40 degrees, and more preferably less than about 30 degrees relative to the longitudinal axis of the lever. For example, the second lever angle 72 may range from about 5 degrees to about 40 degrees, and more preferably from about 10 degrees to about 30 degrees relative to the longitudinal axis of the lever. It is appreciated that in one specific embodiment, the interior wall portion 48 extends to the exterior wall portion 50 so as to form an arcuate end portion of the engagement portion 40.

The interior wall portion 48 extends along the upper face of the lever 30 and defines a second profile (e.g., flat, arcuate, or a combination of both) that receives the first end 64 of the brake cable 29 (e.g., button, hook, loop, or otherwise) to assist in maintaining or to maintain the first end 64 of the brake cable 29 therein. Preferably, the interior wall portion 48 may be generally arcuate so as to define a C-shaped profile about the engagement portion 40.

It is further appreciated that as the lever rotates to the extended position, the exterior wall portion of the engagement portion 40 (e.g. at least one of the first chamfered wall and the second chamfered wall) may be generally parallel to the upper wall portion 53 of the interior wall structure 52 as shown in FIG. 9E.

The lever 30 may further include one or more bends 44 that displaces a portion of the lever 30 outward relative one or both ends of the lever 30. Preferably, the second end of the lever 30 includes at least one bend 44 such that a first member portion 74 may be displaced from a second member portion 76 so as to define a valley 46 therebetween. With reference to 3A, 4A, and 5A, both the first and second member portions 74, 76 are bent outward to form the valley 46, which extends generally transversely through the engagement portion 40. Desirably, when included, it is appreciated that the valley 46 may be configured for receiving a portion of the brake cable 29 (e.g., a portion of the brake cable body 98 FIGS. 3A through 4F), a portion of the interior wall structure 52 (e.g., a portion of the boss portion 90 FIGS. 5A through 5C), or a combination of both between the first and second portions 74, 76, respectively, to assist in the attachment of the brake cable 29, as discussed below. It is further appreciated that in one embodiment as shown in FIGS. 5A through 5C, the gap 88 may include the valley 46 or otherwise and may be defined by the distance from an interior face of the valley 46 between the first and second member portions 74, 76 of the engagement portion 40 and the interior wall structure 52 of the casing (e.g. the boss portion 90, when included) when a portion of the boss portion 90 may extend into the valley 46 between the first and second member portions 74, 76 of the engagement portion of the lever. However in another embodiment as shown in FIGS. 3A through 4F, the gap 88 may be defined by the distance between the exterior wall portion of the engagement portion (e.g., the exterior wall portion of the first and second member portions 74, 76, respectively), and the interior wall structure 52 of the casing (e.g. the boss portion 90, when included).

It is contemplated that the lever 30 may include one or more longitudinally extending plates that may be fixedly secured to one another. The one or more plates may include a first plate and second plate that may be generally symmetrical, though not required. When included, the first and second plate may be fixedly secured substantially along the lever 30 (e.g., except between the first and second portions of the second end). It is appreciated that the bends 44 (e.g., displacement) of the second end portion to define the first and second portions 74, 76 may be formed prior to or after securement of the first and second plates. Alternatively, when a single plate or more plates are used, it is further contemplated that the second end portion may be deformed (e.g., split, cut, bent, or otherwise, or any combination thereof) to form the first and second portions 74, 76 and the valley 46, therebetween.

The actuating mechanism 10 may further include one or more biasing members 82 (e.g., a spring or otherwise) for applying a return force upon the engaging surface 100 of the lever 30. The biasing member 82 may include a first end fixedly secured to a portion of the casing 31 and a second end configured for limiting the amount of rotation of the lever 30, for returning the lever 30 to the retracted position, or a combination of both. The biasing member 82 may be metallic, non-metallic, or a combination of both. The biasing member 82 may include a surface that is generally flat, arcuate, or a combination of both. It is appreciated that in one embodiment, the second end portion of the biasing member 82 may be in contact with the lever 30 while the lever 30 is in the retracted position. However, in another embodiment, the second end portion of the biasing member 82 may be displaced from the lever 30 while the lever 30 is in the retracted position such that there is a gap 92 (FIG. 5B) between the second end of the biasing member 82 and the upper face of the lever 30. Desirably, the second end of the biasing member 82 may be generally in contact with the upper surface of the lever 30 while the lever 30 is in the retracted position to assist in reducing or eliminating noise such as rattling or otherwise.

With reference to FIGS. 3A through 3C, the biasing member 82 may include a generally flat portion positioned parallel to and in contact with the first upper wall portion 60 of the central portion of the casing 31 for securement thereto. In another embodiment, the generally flat portion of the biasing member 82 may be may be positioned parallel to and in contact with the second upper wall portion 62 of the free end portion of the casing 31 for securement thereto as shown in FIGS. 4A through 5C. It is appreciated that the securement of the biasing member 82 may be accomplished though an opening 94 in one or more walls (e.g., 32, 34, 60, 62, or otherwise) of the casing 31 to attach the biasing member 82 to the casing 31. More specifically, the lower face of the biasing member 82 is fixedly secured to the exterior face of the first and second upper wall 60, 62 of the casing 31. It is appreciated this configuration is not limiting and that other configurations of attachment of the biasing member 82 to the casing 31 are contemplated.

Optionally or as an alternative, the actuating mechanism 10 may further include a protruding member 84, as shown in FIGS. 4A through 5C, to assist the biasing member 82 in limiting the rotation of the lever 30 and/or returning the lever 30 to the retracted position. The protruding member 84 may be integrally formed with one of the walls (e.g., 60, 62) of the casing 31 or may be a separate component secured to one of the walls (e.g., 60, 62) of the casing 31. Preferably the protruding member 84 may be integrally formed to an upper wall portion (e.g., the second upper wall portion 62) of the casing 31 such that the protruding member 84 may be deformed downward towards the lever 30 from an upper wall portion (e.g., 60, 62). It is appreciated that the protruding member 84 may be metallic, non-metallic (e.g., plastic, rubber, or otherwise), or otherwise, or any combination thereof.

With reference to FIGS. 9A through 9G, one exemplary embodiment showing the insertion (e.g., engagement, attachment, or otherwise) of the first end 64 of the brake cable 29 into the actuating mechanism 10. It is appreciated that the attachment of the brake cable 29 may be accomplished with limited or no visual access for the installer relative to the inside of the brake assembly, where the brake cable 29 is being attached. It is further appreciated that the attachment of the brake cable 29 may be accomplished as various stages of the manufacturing of a vehicle or possibly after completion of the vehicle assembly.

The attachment of the brake cable 29 may be achieved by pushing the first end 64 of the brake cable 29 within the actuating mechanism 10, while the lever 30 is located in the retracted position (e.g., about 0 degrees of rotation relative to the longitudinal axis) and the gap 88 is a distance less than about the width of the first end 64 of the brake cable 29 as shown in FIG. 9A.

As the first end 64 of brake cable 29 is pushed in to the actuating mechanism 10, the first end 64 of the brake cable 29 contacts at least one of the lower wall portion 55 of interior wall structure 52 and the second chamfered wall 70 to assist in directing the first end 64 of the brake cable 29 towards the gap 88. The lower wall portion 55 and the second chamfered wall 70 guide the first end 64 of the brake cable 29 into the gap 88 while rotating the lever 30 upwards (e.g., generally against the return force of the biasing member 82) as shown in FIG. 9B. It is appreciated that upon rotation of the lever 30 from the retracted position, the biasing member 82 may be in contact or becomes in contact with the lever 30 (e.g., the upper face of the lever 30) to apply a return force thereon. It is appreciated that the return force applied by the biasing member is generally less than the pushing force applied by the first end 64 of the brake cable 29 so as to enable the lever 30 to rotate towards the extended position. The lever 30 rotates upward so as to increase the distance of the gap 88 and enabling the first end 64 of the brake cable 29 to be pushed further upward into the gap 88. The first end 64 of the brake cable 29 continues to be guided along the lower wall portion 55 of the interior wall structure 52 and the second chamfered wall(s) 70 of the first and second portion 74, 76, respectively as shown in FIG. 9C.

The first end 64 of the brake cable 29 continues to push against the lever to rotate the lever 30 while both move generally against the return force of the biasing member 82 (e.g., generally towards the upper portion of the casing 31). Once the first end 64 of the brake cable 29 is generally positioned about the first chamfered wall 66 of the engagement portion, the first end 64 of the brake cable 29 begins to deflect (e.g., bend) along the upper wall portion 53 of the interior wall structure 52 towards the distal portion of the integral end portion of the casing 31 (e.g., away from the engagement portion 40 of the lever 30) as shown in FIG. 9D.

With reference to FIG. 9E, the first end 64 of the brake cable 29 is pushed through the gap 88 such that the lever 30 is generally located in the extended position and the first end 64 of the brake cable 29 is generally positioned above the engagement portion 40, the interior wall structure 52 (e.g., the boss 90), or both. It is appreciated that once the end 64 of the brake cable 29 has passed through the gap 88, a substantial portion or an entire portion of the first end 64 of the brake cable 29 may be generally free of contact with the engagement portion 40 of the lever 30 (as shown in FIG. 9F), so that the return force applied by the biasing member 82 onto the lever 30 is generally or completely removed from the first end 64 of the brake cable 29 so as to enable the biasing member 82 to "spring back" to rotate the lever 30 downward, clockwise, or otherwise (e.g., towards the lower portion of the casing 31) towards the retracted position of the lever 30 while narrowing the gap 88.

Desirably, the first end 64 of the brake cable 29 and/or the cable body 98 may also "springs back" into alignment thereby positioning the cable body 98 between the first and second portions 74, 76 of the engagement portion 40 as the lever 30 rotates downward. Thereafter, the brake cable 29 is pulled downward (e.g., with the return force of the biasing member 82 such as towards the lower portion of the casing i.e, the interior of the vehicle) towards the interior wall portion 48 of the engagement portion 40 so that the first end 64 of the brake cable 29 seats within the engagement portion 40, so as to be generally maintained therein. While the biasing member 82 applies a return force on the lever 30, the first end of the brake cable 29 is pulled downward (e.g., towards the lower portion of the casing 31, or a combination of both, the lever 30 rotates accordingly, to the retracted position, as shown in FIG. 9G.

It is contemplated that in the retracted position, the biasing member 82 may be displaced (e.g., substantially or entirely free of contact) from engaging surface 100 of the lever 30, the brake cable 29 may be loosened or stretched over time to cause slack, or a combination of both such that the first end 64 of the brake cable 29 may possibly move about the interior wall portion 48 of the engagement portion 40 or within the upper portion of the cavity 80. However, because the lever 30 is generally maintained in the retracted position (e.g., by the biasing member 82 or otherwise) the gap 88 is generally maintained in a narrow distance such that the first end 64 of the brake cable 29 is prevented from returning through the gap 88 and becoming uninstalled (e.g., unattached, unengaged, or otherwise). More particularly, it is further contemplated that after the attachment of the brake cable 29 (e.g., the first end 64 of the brake cable 29) and when the lever is in the retracted position, that if the brakes are moved separately and/or separately assembled with the wheel axle or knuckle assembly in one or more places during the vehicle assembly process, the first end 64 of the brake cable 29 may not substantially or completely disengage itself and become unattached (e.g., uninstalled) from about the interior wall portion 48 of the engagement portion 40 or within the upper portion of the cavity 80, because of the narrowness of the gap 88.

It is appreciated that prior art embodiments further include a spring member (e.g., spring plate member) generally positioned within the gap between the lever and the interior surface of the casing for assisting in the attachment of the brake cable as shown in U.S. Pat. No. 5,322,793 and Japanese Patent Application No. JP 2004-154693, which are herein incorporated by reference for all purposes. In this configuration, the length of the lever may be limited due to the presence of the spring member, the spring member thickness, the spring member angle, or otherwise. More particular, in this configuration the end of the cable has to pass through the gap between the interior wall of the casing and the end portion of the lever so that the gap should be greater than the end of the cable (e.g., button, or otherwise) plus the additional size (e.g., thickness) of the spring plate. This limitation may reduce the opportunity to lengthen the lever and results in reduced lever ratios for a given casing size, which may not be advantageous. In contrast, the lever of the present invention rotates (e.g., upwards such as against the return force of the biasing member) and moves away (e.g., from the interior wall structure) to provide the distance necessary for the end of the brake cable to pass through the gap, which should be the distance of about the size of the end of the brake cable. This configuration of the present invention may increase the opportunity to lengthen the lever and advantageously the lever ratio.

Accordingly, it is contemplated that the exterior wall portion 50 of the engagement portion 40 may be positioned in close proximity to the interior wall structure 52 of the casing so that the gap 88 is minimal in the retracted position of the lever 30 while still enabling the lever 30 to rotate to the extended position. Accordingly, in one specific embodiment, by eliminating a spring member (e.g., a spring plate) within the gap 88 along the interior wall structure 52 of the casing 31, the length of the lever 30 within the cavity 80 of the casing 31 may be increased thereby respectively increasing the lever ratio. It is believed by increasing the lever ratio; one can optimize (e.g., increase) the brake input force to the output torque relative to the amount of force applied by the operator engagement feature to the brake lever through the brake cable for a similarly shaped actuating mechanism. Increasing the lever ratio without increasing the overall size of the components helps in incorporating actuating mechanisms in brake assemblies when limited packaging space is available. The lever ratio may be generally defined by the formula (x-component/y-component) where the y-component may be the distance (e.g., the transverse distance) from about the pivotal axis to about the input force location to the brake elements (e.g., between the fingers of the distal portion) and the x-component may be the distance (e.g., the longitudinal distance) from about the pivotal axis to about the middle of the engagement portion of the lever as shown in FIG. 10. It is appreciated that the lever ratio may range from 1:1 to about 10:1, and preferably from about 3:1 to about 7:1 relative to a similarly shaped actuating mechanism (e.g., casing).

The components forming the actuating mechanism 10 may be formed of similar or dissimilar materials. They may be formed of a high strength material, a hardened material (selectively or entirely), or combinations thereof, to translate or receive the application of force to or from other the components of the actuating. Optionally, they may also be configured to resist wear from the rotational movement between the first and second walls 32, 34 and lever 30, from contact between the wall members and braking elements 18, and/or from contact between the lever 30 and operator engagement feature. These contact surfaces may be selectively or entirely coated with friction reducing material, or surface treated for locally hardening or otherwise altering the physical characteristics of the material. This optional wear resistant feature may be derived from the composition of the material forming the actuating components or may comprise applying over some or all of the contacting surfaces a coating, surface treatment, a laminated layer, or any combination thereof. Suitable materials for forming the components of the actuating mechanism 10 include metal, ceramic, or other high strength materials. In one configuration the material forming the components comprise a high strength steel such as SAE J 2340 420 X/Y. However, other materials are available and anticipated with the present invention such as those commonly used in the industry for forming mechanical brake components for vehicles, or otherwise.

The actuating components may be formed using suitable forming techniques for the given material. However, with the use of metal, it is contemplated that the components may be formed through a stamping process, a machining process, or both. Accordingly, in at least one configuration, the lever 30, the first and second walls 32, 34, or both, may comprise a substantially flat member. The thickness of the actuating components may comprise any suitable thickness. For example, the thickness of the actuating components may be from about 3 mm to about 8 mm. The lever 30, walls, or both, may be interchangeable and reversible to be configured for placement on a brake assembly 12 located on either side of a vehicle.

It should be appreciated that one or more additional features may be added to further improve the performance capabilities of the present invention. For example, a lubricant may be used between contact surfaces of the components of the actuating mechanism 10. The lubricant may also be used between the actuating mechanism 10 and other components such as components of the brake assembly 12, the operator engagement feature, or otherwise. Suitable lubricants include grease or other similar types of lubricants that have surface cohesion properties for maintaining the lubricant on the components in which it is lubricating.

In general, for operation of one of the preferred assemblies herein, the brake assembly 12 is activated through an application of force upon the engagement feature. The application of force is translated to one end of the lever 30 via the brake cable 29 for applying a tensile force to move the lever 30, or otherwise. This application of force causes the lever 30 to rotate to the extended position with respect to longitudinal axis and/or the first and second wall 32, 34 as a result of the staggered pivotal connection between the first and second wall 32, 34. As the lever 30 rotates, through the pivotal connections, the distal portions move outwardly, to engage braking elements 18 located on opposite sides of the actuating mechanism 10 and apply a force thereto sufficient to cause the braking elements to move away from each other. This force is greater than the force being applied to the braking elements by the housing spring member. This movement causes the friction pads 20 of the braking element 18 to engage a corresponding braking component, typically the brake drum, to prevent an associated wheel of the brake assembly from rotating.

Upon release of the operator engagement feature, the force being applied to the lever 30 is released or otherwise becomes less than the housing spring member for the braking elements 18. Through the housing spring member 28, the braking elements move towards the actuating mechanism 10 and each other. This movement results in a force being applied to the first and second walls 32, 34, which in turn results in a force being applied to the actuating lever 30 to return the lever to retracted position.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such features may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An actuating mechanism for a parking brake assembly comprising:
   a) a casing that includes a first wall, a second wall, opposing brake shoe contract surfaces, and at least one interior wall structure, including:
      i. an upper wall portion,
      ii. a lower wall portion, and
      iii. a middle wall portion or boss;
   b) a lever located in the casing and pivotally engaging the casing, wherein the lever has a first member portion and a second member portion, wherein the first member portion and the second member portion each include an engagement portion having at least one exterior wall portion with at least one angle opposing the lower wall portion of the interior wall structure of the casing,
   c) a biasing member fixedly secured to the casing or to the lever and juxtaposed to a surface of the lever or casing; and
   d) a brake cable including a first end;
   wherein during attachment of the brake cable to the parking brake assembly, the brake cable rotates the lever upward with the first end of the brake cable contacting the lower wall portion, the middle wall portion, and the upper wall portion of the interior wall structure in sequence and the angled exterior wall portion of the lever so that the brake cable is pushed through a gap between the lever and the at least one interior wall structure of the casing, and the first end of the brake cable becomes seated on the lever;
   wherein the gap is a distance between the middle wall portion or boss of the at least one interior wall structure and a center of a valley of the lever when measured along a longitudinal axis that extends through the contract surfaces of the casing; and
   wherein the distance between the middle wall portion or boss of the at least one interior wall structure and the center of the valley of the lever is smaller than a distance between the upper wall portion and the lower wall portion of the interior wall structure and the center of the valley of the lever when measured along the longitudinal axis that extends through the contract surfaces of the casing.

2. The actuating mechanism for a parking brake assembly of claim 1, wherein the upper wall portion has an angle from about 5 to about 40 degrees relative to a transverse axis.

3. The actuating mechanism for a parking brake assembly of claim 1, wherein the lower wall portion has an angle from about 30 to about 70 degrees relative to a transverse axis.

4. The actuating mechanism for a parking brake assembly of claim 1, wherein portions of the at least one interior wall structure extend into and between the first member portion and the second member portion of the lever.

5. The actuating mechanism for a parking brake assembly of claim 1, wherein the brake cable deflects along the upper wall portion of the interior wall structure and away from the lever when the brake cable is pushed through the gap between the lever and the at least one interior wall structure.

6. The actuating mechanism for a parking brake assembly of claim 5, wherein the brake cable includes a body portion that contacts a surface of the middle wall portion or boss of the casing during attachment of the brake cable.

7. The actuating mechanism for a parking brake assembly of claim 1, wherein the engagement portion of the lever is proximate to the interior wall structure of the casing so that the brake lever has a lever ratio from about 3:1 to about 7:1.

8. The actuating mechanism for a parking brake assembly of claim 1, wherein the brake cable springs into alignment after the brake cable is pushed through the gap between the lever and the at least one interior wall structure as the lever rotates downward.

9. The actuating mechanism for a parking brake assembly of claim 1, wherein the lever is generally maintained in the retracted position and in proximity to the gap between the at least one exterior wall portion of the lever and the interior wall structure of the casing so that the brake cable is prevented from becoming unintentionally uninstalled.

10. The actuating mechanism for a parking brake assembly of claim 1, wherein the lever includes a first chamfered wall and a second chamfered wall.

11. The actuating mechanism for a parking brake assembly of claim 10, wherein the first chamfered wall has an angle from about 35 to about 75 degrees relative to the longitudinal axis of the lever and the second chamfered wall has an angle from about 5 to about 40 degrees relative to the longitudinal axis of the lever.

12. The actuating mechanism for a parking brake assembly of claim 1, wherein the upper wall portion and the lower wall portion converge to form the middle wall portion that has a generally flat interior face or boss.

13. The actuating mechanism for a parking brake assembly of claim 1, wherein the first wall and the second wall converge to form the interior wall structure.

14. The actuating mechanism for a parking brake assembly of claim 1, wherein the upper wall portion is angled to divert the first end of the brake cable so that the first end of the brake cable is seated in the engagement portion of the lever once the lever has returned, to its retracted position, and the interior wall structure is a separate structure fixedly secured to the casing.

15. The actuating mechanism for a parking brake assembly of claim 1, wherein the casing has a second upper wall portion with an opening that receives and secures the biasing member and wherein the second upper wall portion has a protruding member to assist the biasing member in limiting rotation of the lever.

16. The actuating mechanism for a parking brake assembly of claim 1, wherein the casing includes a first upper wall portion that has an opening that receives and, secures the biasing member so that the biasing member is attached to the casing.

17. An actuating mechanism for a parking brake assembly comprising:
   a) a casing that includes a first wall, a second wall, opposing brake shoe contact surfaces, and at least one interior wall structure, including:
      i. an upper wall portion,
      ii. a lower wall portion, and
      iii. a middle wall portion or boss;
   b) a lever located in the casing and pivotally engaging the casing, wherein the lever has a first member portion and a second member portion, wherein the first member portion and the second member portion each include an engagement portion having at least one exterior wall portion with at least one angle opposing the lower wall portion of the interior wall structure of the casing,
   c) a biasing member fixedly secured to the casing or to the lever and juxtaposed to a surface of the lever or casing; and
   d) a brake cable including a first end;
   wherein during attachment of the brake cable to the parking brake assembly, the brake cable rotates the lever upward with the first end of the brake cable contacting the lower wall portion, the middle wall portion, and the upper wall portion of the interior wall structure in sequence and the angled exterior wall portion of the lever so that the brake cable is pushed through a gap between the lever and the at least one interior wall structure of the casing, and the first end of the brake cable becomes seated on the lever;
   wherein the at least one interior wall structure extends into and between the first member portion and the second member portion of the lever;
   wherein the gap is a distance between the middle wall portion or boss of the at least one interior wall structure and a center of a valley of the lever when measured along a longitudinal axis that extends through the contact surfaces of the casing, and
   wherein the distance between the middle wall portion or boss of the at least one interior wall structure and the center of a valley of the lever is smaller than a distance between the upper wall portion and the lower wall portion of the interior wall structure and the center of the valley of the lever when measured along the longitudinal as that extends through the contact surfaces of the casing.

18. The actuating mechanism for a parking brake assembly of claim 17, wherein the upper wall portion forms an angle from about 5 to about 40 degrees relative to a transverse axis, and the lower wall portion forms an angle from about 30 to about 70 degrees relative to the transverse axis.

19. The actuating mechanism for a parking brake assembly of claim 17, wherein the brake cable deflects along the upper wall portion of the interior wall structure and away from the lever when the brake cable is pushed through the gap between the lever and the at least one interior wall structure, and the brake cable springs into alignment after the brake cable is pushed through the gap between the lever and the at least one interior wall structure as the lever rotates downward.

20. The actuating mechanism for a parking brake assembly of claim 17, wherein the lever includes a first chamfered wall and a second chamfered wall, the first chamfered wall has an angle from about 35 to about 75 degrees relative to the longitudinal axis of the lever and the second chamfered wall as an angle from about 5 to about 40 degrees relative to the longitudinal axis of the lever, and the interior wall structure is a separate structure fixedly secured to the casing.

* * * * *